(12) United States Patent
Kim

(10) Patent No.: US 7,088,807 B2
(45) Date of Patent: Aug. 8, 2006

(54) CALL PICK-UP SYSTEM AND METHOD OF A SWITCHING DEVICE

(75) Inventor: Seoung Cheoun Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 10/736,633

(22) Filed: Dec. 17, 2003

(65) Prior Publication Data

US 2004/0125928 A1 Jul. 1, 2004

(30) Foreign Application Priority Data

Dec. 18, 2002 (KR) .................. 10-2002-0081310

(51) Int. Cl.
*H04M 1/56* (2006.01)
*H04M 1/00* (2006.01)

(52) U.S. Cl. .................. 379/142.04; 379/156
(58) Field of Classification Search .......... 379/142.01, 379/142.04, 142.07, 142.12, 156, 164, 165
See application file for complete search history.

(56) References Cited

U.S. PATENT DOCUMENTS

| 4,296,282 A | * | 10/1981 | O'Neil et al. ............... 379/164 |
| 5,815,563 A | * | 9/1998 | Ardon .................... 379/211.01 |
| 5,859,903 A | * | 1/1999 | Lee ............................. 379/157 |
| 6,535,595 B1 | * | 3/2003 | Nakamura .................. 379/164 |

* cited by examiner

*Primary Examiner*—Duc Nguyen
*Assistant Examiner*—Barry W. Taylor
(74) *Attorney, Agent, or Firm*—Fleshner & Kim LLP

(57) ABSTRACT

The present invention relates to a call pick-up system and method for a switching device that makes selective call pick-up possible by using caller information. In particular, by including a caller information analysis block in a subscriber call process block of a switching device, when multiple subscribers belonging to a same call pick-up group receive calls at the same time, the present invention makes it possible to search for the ringed subscribers, receive caller information from the relevant subscribers, and provide the caller information to call pick-up subscribers. In this manner, selective call pick-up is enabled. This is appropriate for offices having multiple telephones. Further, according to the present invention, it is possible to choose to give up the call pick-up.

16 Claims, 5 Drawing Sheets

(a) If the subscriber's caller telephone number is displayed

```
1 S . C . K i m    2 B . S . . R i m    3 S . H . K
w o n    4 M . R . C h a    * * * * * * * * * *
```

(b) If the subscriber's name is displayed

CALL PICK-UP SYSTEM AND METHOD OF A SWITCHING DEVICE

BACKGROUND OF THE INVENTION

1. Field of the Invention

The present invention generally relates to communication systems, and more particularly to a system and method for controlling call pick-up in a switching device of a communication system.

2. Background of the Related Art

FIG. 1 illustrates a call pick-up system of a switching device in the related art which executes a call pick-up system for subscribers of a call pick-up group 30. The system comprises multiple subscriber telephones 31 belonging to a call pick-up group 30; a subscriber process block 20 for interfacing with the telephones 31; and multiple subscriber call process blocks 10-1~10-n for conducting call processes of telephones 31 through the subscriber process block 20.

Each of the subscriber call process blocks 10-1~10-n comprises a call process common block 11 for processing subscriber operations; a LCD control block 12 for controlling a LCD (Liquid Crystal Display) and transmitting relevant information to the subscriber; a digit analysis block 13 for analyzing the digits dialed by the subscriber; and a ring search block 14 for searching for the subscribers whose phones are ringing.

FIG. 2 illustrates a call pick-up method in a switching device of the related art having the above-described structure. If the telephones of multiple subscribers belonging to a call pick-up group are ringed at the same time, the subscriber (e.g., call pick-up subscriber) dials the call pick-up feature code in order to execute the call pick-up. Then, the digit analysis block 13 analyzes the digits dialed by the subscriber. If the dialed digits match the call pick-up feature code, the digit analysis block 13 notifies the call process common block 11 of the match.

Thereupon, the ring search block 14, which is controlled by the call process common block 11, analyzes the status of the subscribers 30 belonging to the call pick-up group. In other words, the ring search block 14 identifies which subscriber's phone is ringing. If the ring search block 14 identifies the subscriber whose phone is ringing, the identity of the subscriber is notified to the call process common block 11.

The LCD control block, which is controlled by the call process common block 11, sends a message to the subscriber whose phone is ringing and informs the subscriber that the call can be picked up by another subscriber (i.e., a call pick-up subscriber). Then, the subscriber whose phone is ringing transmits a response message to the call pick-up subscriber.

Thereupon, the call pick-up subscriber analyzes the response message transmitted by the subscriber, identifies who the caller is, and notifies the identified caller of the call pick-up. Then, one-to-one communication takes place.

Now, the selective call pick-up process is explained. If the phones to multiple subscribers 31 belonging to the same call pick-up group 30 (e.g., the first ring subscriber and the second ring subscriber) ring at the same time, a call pick-up subscriber dials a call pick-up feature code to. execute the call pick-up.

Then, the digit analysis block 13 analyzes the digits dialed by the call pick-up subscriber. If the dialed digits match the call pick-up feature code, the digit analysis block 13 notifies the call process common block 11 of the match.

The ring search block 14 analyzes the status of subscribers' phones 31 belonging to the call pick-up group 30. Then, all of the subscribers, whose phones are ringing, are identified (e.g., the first ring subscriber or second ring subscriber).

When the ringed subscribers (e.g., the first ring subscriber and the second ring subscriber) are identified by the ring search block 14, the information of these subscribers (e.g., the first and second ring subscribers) is transmitted to the call process common block 11.

Through the LCD control block 12, the information of the subscribers (e.g., the first and second ring subscribers) is displayed on the telephone LCD of the call pick-up subscriber. At this time, the LCD control block 12 assigns an ID (Identifier) number to the ringed subscriber's phone.

Thereupon, the call pick-up subscriber uses the information displayed on the telephone LCD (i.e., the ID number) to designate a specific subscriber (e.g., the first ring subscriber or the second ring subscriber). Thus, the specified subscriber (e.g., the first ring subscriber or the second ring subscriber) is notified of the call pick-up subscriber.

The specified subscriber (e.g., the first ring subscriber or the second ring subscriber) then transmits a response message to the call pick-up subscriber. The call pick-up subscriber analyzes the response message and finds out who the caller is (e.g., the first caller or the second caller), and notifies the caller (e.g., the first caller or the second caller) of the call pick-up. Then, one-to-one communication takes place.

As described above, in the call pick-up system of the switching device of the related art, there are two cases of call pick-up: In the first case described above, the subscriber whose phone is ringing cannot be selected; and in the second case described above, selective call pick-up is possible by using the information of the subscribers whose phones are ringing. According to the call pick-up technology of the related art, when a call pick-up feature code is dialed, a call pick-up takes place automatically.

Accordingly, in the related art, it is impossible to conduct a selective call pick-up based on the caller's information, such as the caller number or the caller name. Further, it is impossible to choose to accept or refuse the call based on the caller's identity.

SUMMARY OF THE INVENTION

An object of the invention is to solve at least the above problems and/or disadvantages and to provide at least the advantages described hereinafter.

Another object of the present invention is to provide a call pick-up system and method for a switching device that makes selective call pick-up possible based on the caller information at the time of call pick-up in the switching device.

Another object of the present invention is to provide a call pick-up system and method for a switching device for an office having multiple telephones by making it possible to selectively pick up calls based on the caller information for multiple subscribers belonging to a call pick-up group.

Another object of the present invention is to provide a call pick-up system and method for a switching device that makes it possible for the subscriber to accept or refuse to pick up the call based on the displayed caller information on the telephone LCD when the phones of multiple subscribers belonging to the same call pick-up group are being ringed.

To achieve these and other advantages and in accordance with the purpose of the present invention as embodied and broadly described, a call pick-up system of a switching device according to the present invention comprises a subscriber call process block for performing the call pick-up function in the switching device; and a caller information analysis block for analyzing information and providing the analyzed information to the call pick-up subscriber.

Preferably, the caller information analysis block generates a message requesting caller information, sends the message to each ringed subscriber, receives response messages from each of ringed subscribers, analyzes the response message including the caller information sent by each ringed subscriber, and builds a caller information table using the caller information and telephone numbers of each ringed subscriber.

Preferably, the caller information table is built by using caller information and subscriber telephone number. In addition, a unique identifier number is assigned to each caller's number.

Alternatively, a call pick-up system of a switching device according to the present invention further comprises: a call process common block which controls all of the actions for performing call pick-up features; a digit analysis block which analyzes the digits dialed by the subscribers and determines whether the dialed digits match the call pick-up feature code or match the unique IDs; a ring search block which analyzes the states of the subscribers' phones belonging to a call pick-up group and searches for the ringed subscribers; and a LCD control blocks or a LCD/LED control block which displays the information analyzed at the caller information analysis block on the LCD or LED (Light Emitting Diode) of the telephone of the call pick-up subscriber.

A call pick-up system of a switching device according to another preferred embodiment of the present invention comprises: a caller information analysis block which analyzes the information of a caller who made the call to the specific subscriber and provides the analyzed information to a call pick-up subscriber; a call process common block which controls all of the actions for performing call pick-up features; a digit analysis block which analyzes the digits dialed by the subscriber and determines whether the dialed digits match the call pick-up feature code or match the unique IDs; a ring search block which analyzes the states of the subscribers' phones belonging to a call pick-up group and searches for the ringed subscribers; and a LCD control block or a LCD/LED control block which displays the information analyzed at the caller information analysis block on the LCD or LED (Light Emitting Diode) of the telephone of the call pick-up subscriber.

A call pick-up method of a switching device according to a preferred embodiment of the present invention comprises: searching for the ringed subscribers; receiving the caller information from the searched subscribers; providing the caller information to a call pick-up subscriber and performing a selective call pick-up by using the caller information when multiple subscribers belonging to the same call pick-up group of a switching device are ringed. Preferably, the caller information is the caller's telephone number or name.

Preferably, executing the call pick-up comprises: analyzing the dialed digits by a call pick-up subscriber and determining whether the dialed digits match the call pick-up feature code; searching for the ringed subscribers belonging to the same call pick-up group and transmitting the caller information request message to each identified ringed subscriber; receiving a response message including the caller information from the ringed subscribers, analyzing the received information, and building a caller information table; notifying the call pick-up subscriber of the caller information by using the caller information table which consists the caller information of all of the ringed subscribers; analyzing the dialed digits by the call pick-up subscriber, determining whether the dialed digits match the specific caller selection code, and notifying the ringed subscriber of the existence of the call pick-up subscriber; receiving a response message from the ringed subscriber and transmitting the response message to the call pick-up subscriber; and receiving a call pick-up notice message from the call pick-up subscriber, transmitting the message to the specific caller, and receiving a response message, thereby enabling one-to-one communication.

Preferably, the caller information table is built by using a caller information subscriber telephone number and a unique identifier number which is assigned to each caller's number.

Preferably, executing the call pick-up further comprises, allowing the telephones of the ringed subscribers to continue to ring so that another call pick-up subscriber can pick up the call when the call pick-up subscriber sends the code for giving up the call pick up after providing the caller information, and waiting for receipt of the call pick-up feature code.

Preferably, executing the call pick-up further comprises: checking whether there are other ringed subscribers in the same call pick-up group and transmitting the caller information request message to the relevant ringed subscribers; and receiving the caller information from the ringed subscribers by analyzing the received information and updating the caller information table.

Additional advantages, objects and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 illustrates a display of a unique ID and a caller information in the method illustrated in FIG. 4.

DETAILED DESCRIPTION OF PREFERRED EMBODIMENTS

Figure 1:
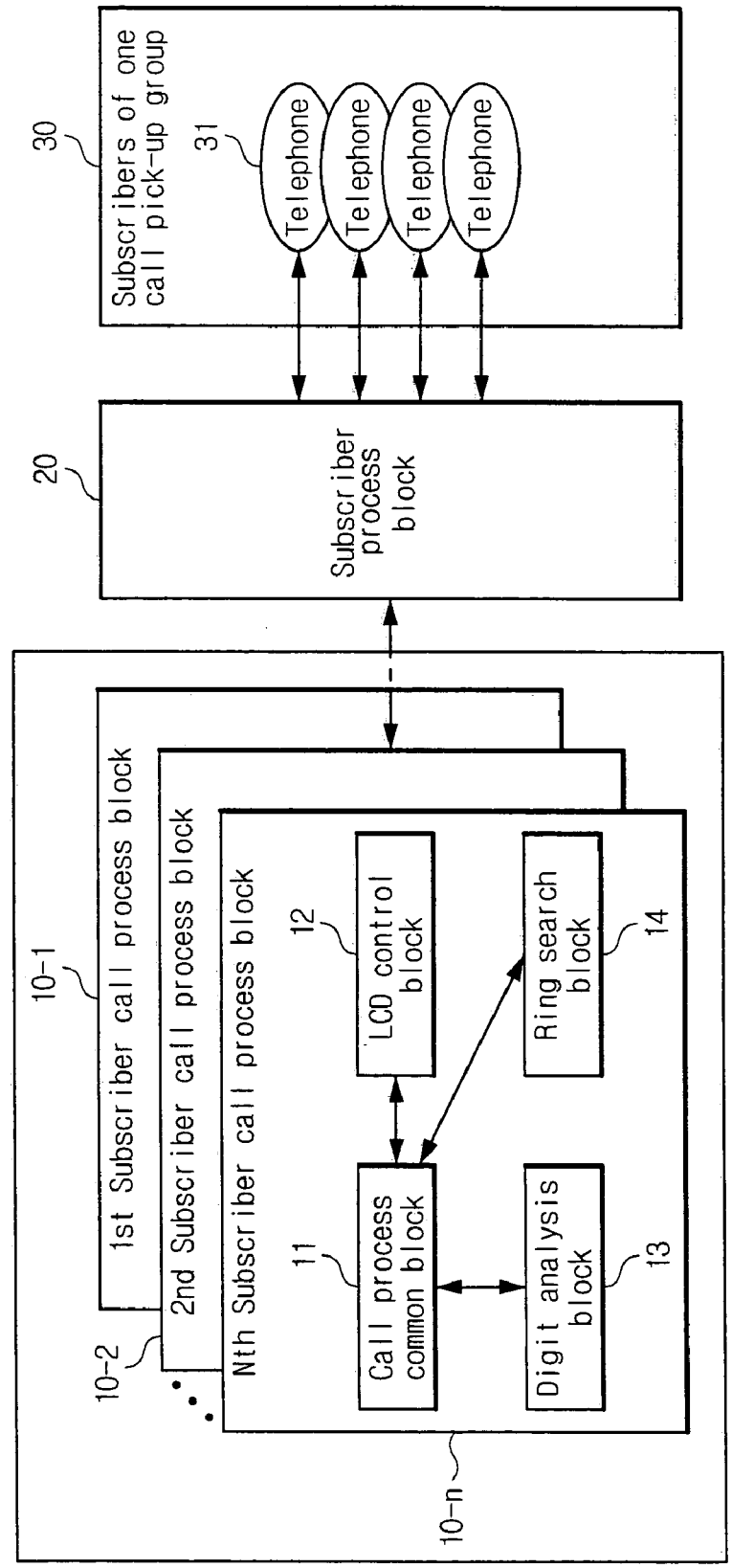
FIG. 1 is a block diagram illustrating a conventional call pick-up system of a switching device in the related art.
Figure 2:
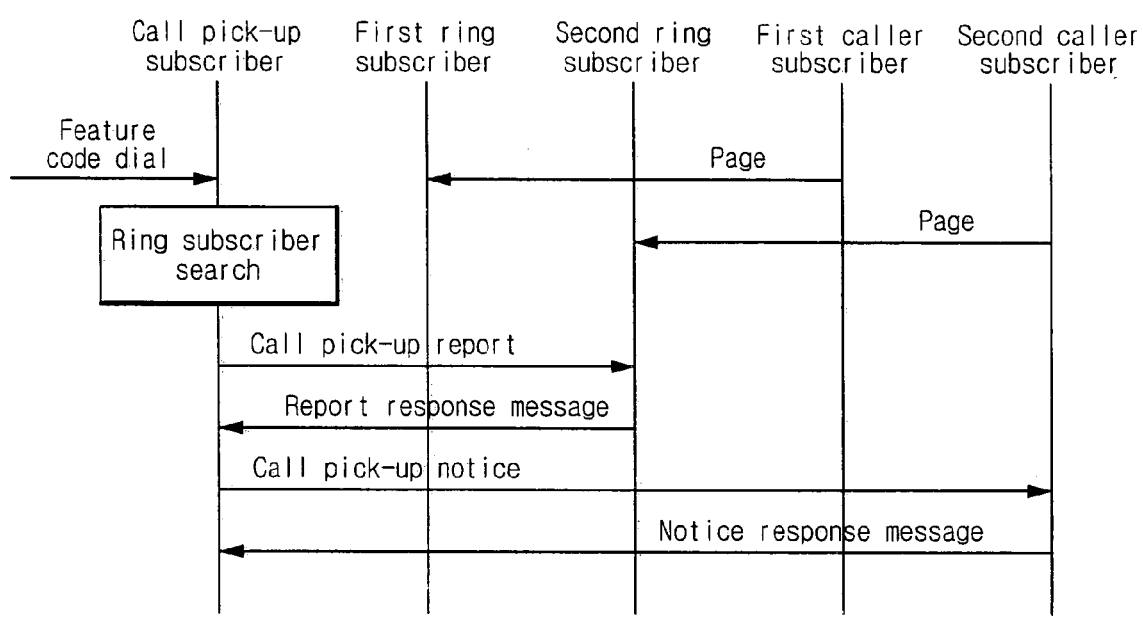
FIG. 2 illustrates a conventional call pick-up method of a switching device in the related art.
Figure 3:
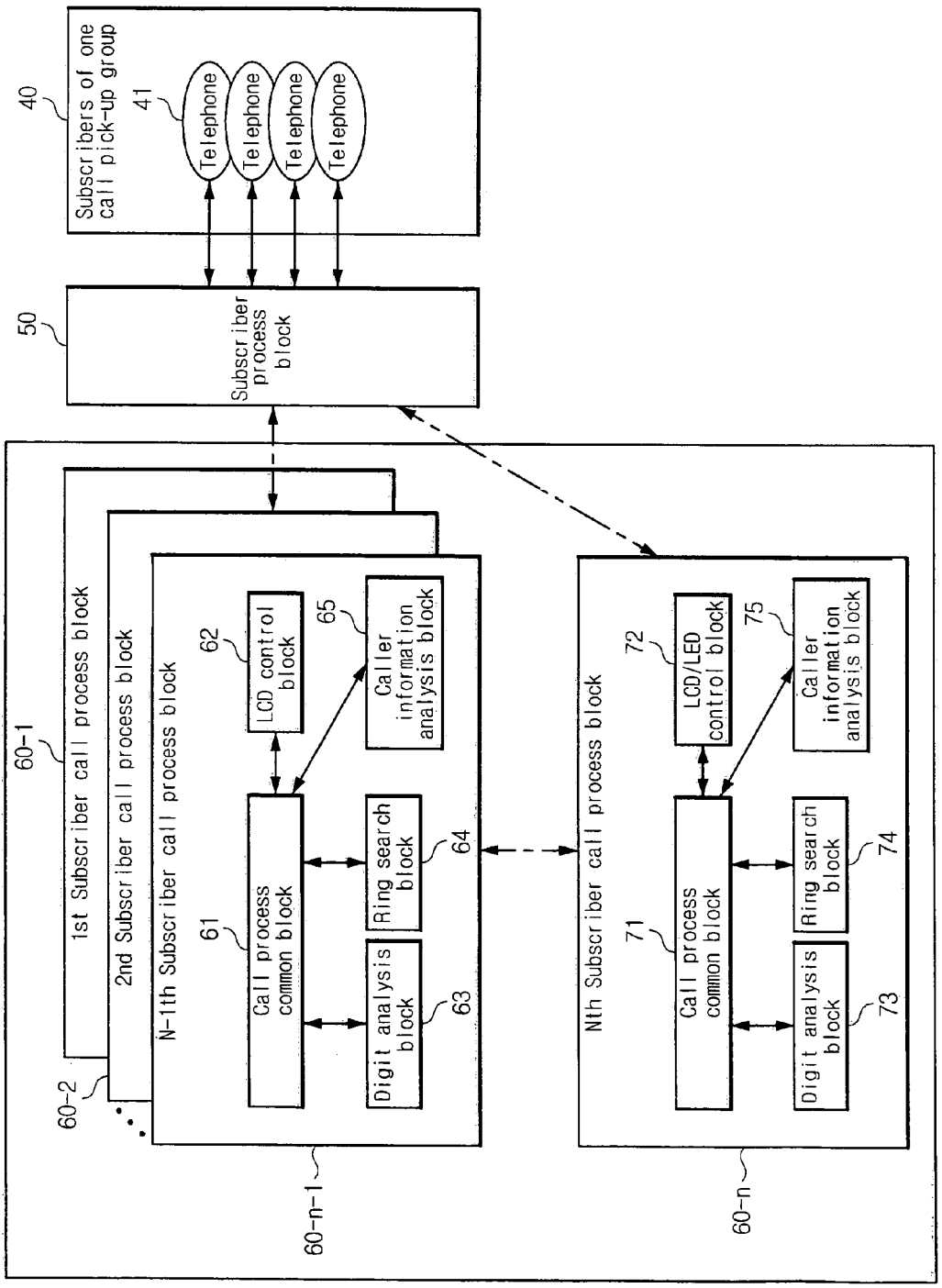
FIG. 3 illustrates a call pick-up system of a switching device according to a preferred embodiment of the present invention.

As illustrated in FIG. 3, a call pick-up system of a switching device according to a preferred embodiment of the present invention comprises: multiple telephones 41 of subscribers belonging to a call pick-up group 40; a subscriber process block 50 interfaces with the relevant telephone 41; and subscriber call process blocks 60-1~60-$n$ which process calls for telephones 41 through the subscriber process block 50.

Each of the subscriber call process blocks 60-1~60-*n* comprises: a call process common block 61 or 71 for processing the relevant subscriber's actions; a LCD control block 62 for controlling the LCD to transmit information to the subscriber or a LCD/LED control block 72 for controlling the LCD/LED to transmit information to the subscriber; a digit analysis block 63 or 73 for analyzing the digits dialed by the subscriber; a ring search block 64 or 74 for analyzing the subscribers of a specific call pick-up group 40 and searching for subscribers whose phones are ringing; and a caller information analysis block 65 or 75 for analyzing information (e.g., the caller telephone number and/or the caller name) of the caller who made the call to the ringed subscriber.

Figure 4:
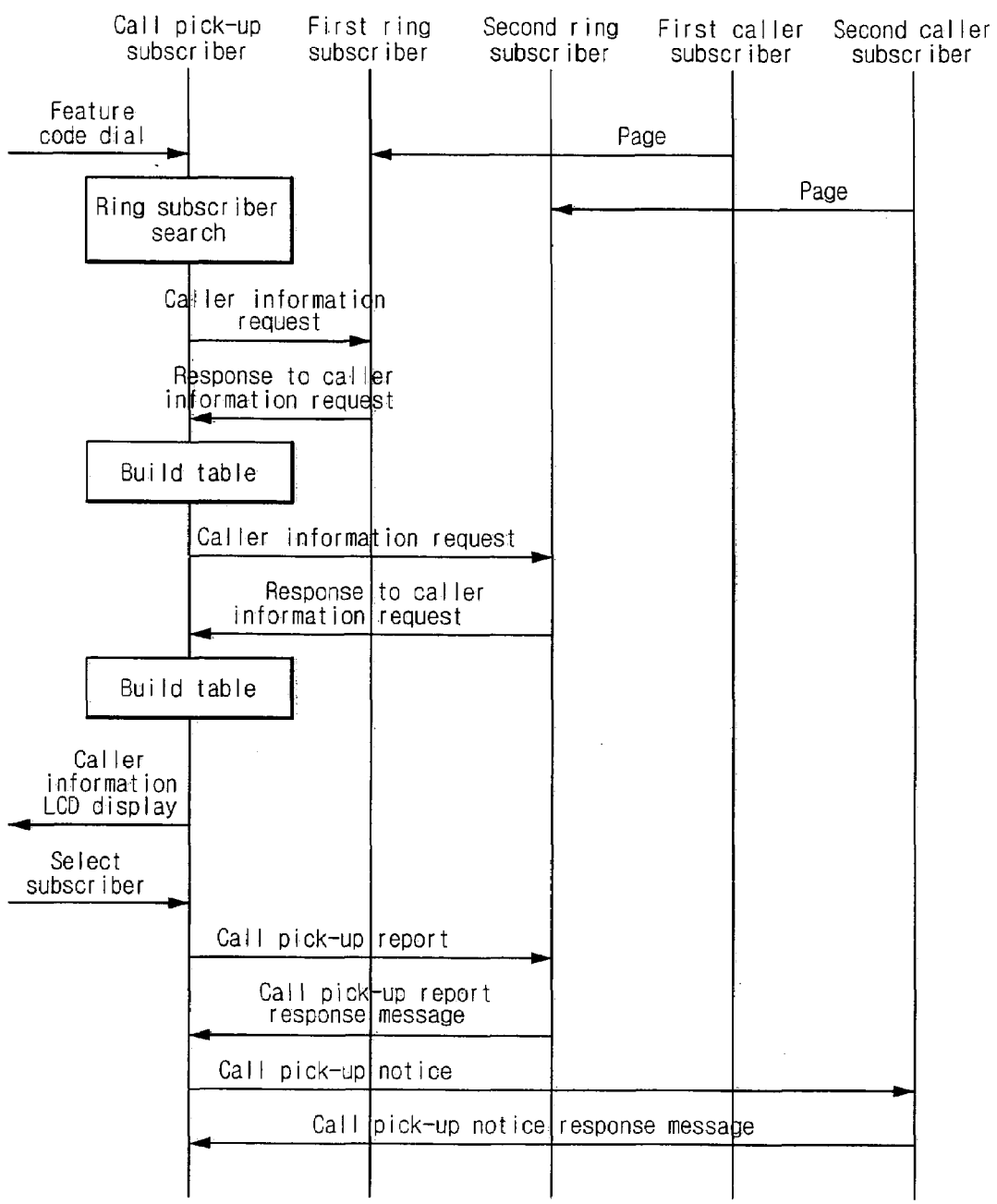
FIG. 4 illustrates a call pick-up method of a switching device according to a preferred embodiment of the present invention.

A call pick-up method of a switching device according to a preferred embodiment of the present invention is explained as follows with reference to FIG. 4. When the telephones of multiple subscribers 40 belonging to the same call pick-up group (e.g., the first ring subscriber and the second ring subscriber) are called at the same time, a subscriber (e.g., the call pick-up subscriber) dials the call pick-up feature code in order to pick up the call.

Then, the digit analysis block 63 or 73 analyzes the digits dialed by the subscriber. If the dialed digits match the call pick-up feature code, the call process common block 61 or 71 is notified of the match.

The call process common block 61 or 71 controls the operations of the ring search block 64 or 74 and the caller information analysis block 65 or 75. The ring search block 64 or 74 analyzes the states of the subscriber's phone 41 belonging to the call pick-up group 40. In other words, the ringed telephones are searched, and the subscriber, whose phone is ringed (e.g., the first ring subscriber or the second ring subscriber), is identified.

The caller information analysis block 65 or 75 generates a message requesting for the caller information and transmits the message to the ringed subscriber (e.g., the first ring subscriber or the second ring subscriber).

Accordingly, each subscriber, whose phone is ringed (e.g., the first ring subscriber and the second ring subscriber), generates a response message, including the caller information (e.g., the caller telephone number or the caller name), and transmits them to the caller information analysis block 65 or 75.

Then, the caller information analysis block 65 or 75 receives a response message from the ringed subscriber (e.g., the first ring subscriber or the second ring subscriber), analyzes the caller information from the received message, and builds a caller information table by using the caller information and the telephone numbers of the ringed subscribers. Preferably, a unique ID is assigned to each caller number.

Then, any additional subscriber receiving a call is checked by analyzing the states of the phones of all subscribers belonging to the same call pick-up group. If there are any other ringed subscribers, the above-described operations are repeated and the caller information table is updated accordingly.

When the caller information table for all of the ringed subscribers belonging to the same call pick-up group is completed, the call process common block 61 or 71 is notified.

Then, the call process common block 61 or 71 controls the operations of the LCD control block 62 or the LCD/LED control block 72. The LCD control block 62 or the LCD/LED control block 72 displays information included in the caller information table for the subscriber (e.g., the call pick-up subscriber). For example, the unique ID and the caller information, such as the caller's telephone number and the caller's name, are displayed on the LCD or the LED for the subscriber (e.g., the call pick-up subscriber).

FIG. 5 illustrates a display of the unique ID and the caller information. As shown in FIG. 5, either the caller telephone number or the caller's name may be displayed.

In the case where the subscriber's caller telephone number is displayed, the caller telephone number of the unique ID '1' may be '3000,' the caller telephone number of the unique ID '2' may be '3001,' and the caller telephone number of the unique ID '3' may be displayed as '3002.'

In the case where the calling subscriber's name is displayed, the caller name of the unique ID '1' may be 'S. C. Kim,' the caller name of the unique ID '2' may be 'B. S. Rim,' and the caller name of the unique ID '3' may be 'S. H. Kwon.'

Then, the subscriber (e.g., the call pick-up subscriber) confirms the information displayed on the telephone. Thereafter, if the call pick-up subscriber dials the digits indicating the unique ID, the digit analysis block 63 or 73 analyzes the dialed digits. If the dialed digits match the unique ID (i.e., if the digits are the code reporting the selection of a specific subscriber such as the first ring subscriber or the second ring subscriber), this information is transmitted to the call process common block 61 or 71. The call process common block 61 or 71 notifies the relevant specific subscriber (e.g., the first ring subscriber or the second ring subscriber) of the existence of a call pick-up subscriber.

Accordingly, the specific subscriber (e.g., the first ring subscriber or the second ring subscriber) transmits a response message to the subscriber (e.g., the call pick-up subscriber). Then, the call pick-up subscriber identifies the caller (e.g., the first caller or the second caller) by analyzing the received response message and then reporting the call pick-up to the relevant caller (e.g., the first caller or the second caller). Then, one-to-one communication takes place.

On the other hand, if the call pick-up subscriber dials the digits to give up the call pick-up after checking the information displayed on the telephone, the digit analysis block 63 or 73 analyzes the dialed digits and notifies the call process common block 61 or 71 of the fact that the digits for giving up the call pick-up have been entered.

Then, the call process common block 61 or 71 causes the multiple subscribers belonging to the same call pick-up group 40 (e.g., the first ring subscriber and the second ring subscriber) to receive rings continuously so that another call pick-up subscriber can pick up the call. Then, the call process common block 61 or 71 waits for the receipt of the call pick-up feature code.

As explained above, according to the present invention, when the phones of multiple subscribers, belonging to a same call pick-up group, ring, the caller's information is displayed on the LCD of the telephones and thus enables selective call pick-up. This is appropriate for call pick-up in an office having many telephones. Further, according to the present invention, it is possible to accept or refuse to pick up a call.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to covet the structures described herein as performing the recited function and not only structural equivalents but also equivalent structures.

What is claimed is:

1. A call pick-up system of a switching device, comprising:
   a digit analysis circuit which determines whether dialed digits from a call pick-up subscriber match a call pick-up feature code, the digit analysis circuit determining the match when a call to subscribers belonging to a same call pick-up is received;
   a ring search circuit which searches states of telephones of the subscribers in response to said match;
   a caller information analysis circuit for analyzing caller information received from the search and providing the analyzed information to the call pick-up subscriber, wherein the the caller information analysis circuit generates a caller information table having a plurality of unique identifiers for identifying a respective plurality of callers; and
   a display control circuit which controls a display of a call pick-up subscriber telephone, wherein the display control block outputs information from the caller identification table formed by the caller information analysis circuit to the call pick-up subscriber display.

2. The system of claim 1, wherein the caller information analysis circuit:
   generates a message requesting the caller information,
   sends the message to one or more of the ringed subscribers,
   receives a response message from each of the ringed subscribers,
   analyzes the caller information included in the response messages, and
   builds the caller information table using the analyzed caller information and telephone numbers of the ringed subscribers.

3. The system of claim 1, further comprising:
   a call process common circuit which allows telephones of the ringed subscribers to continue to ring so that another call pick-up subscriber can pick up the call.

4. The system of claim 3, wherein the call process common circuit allows the telephones to continue to ring when the digit analysis circuit receives a code for giving up the call pick-up from the call pick-up subscriber.

5. The system of claim 1, wherein the digit analysis circuit determines whether additional dialed digits from the call pick-up subscriber match a unique identifier in the caller information table, and if there is a match at least one of the ringed subscribers is notified of the existence of the call pick-up subscriber for establishing one-to-one communication with a caller.

6. The system of claim 1, wherein the display control circuit displays the information from the caller information table on a liquid crystal display or light emitting diode of the telephone of the call pick-up subscriber.

7. The system of claim 1, wherein the callers identified in the caller information table correspond to one or more of the ringed subscribers.

8. A call pick-up method, comprising:
   analyzing dialed digits by a call pick-up subscriber and determining whether the dialed digits match a call pick-up feature code;
   searching for ringed subscribers belonging to a same call pick-up group and transmitting a caller information request message to each of the ringed subscriber;
   receiving response messages including the caller information from the ringed subscribers, analyzing the received caller information, and building a caller information table;
   notifying the call pick-up subscriber of the caller information by using the caller information table, which includes the caller information of the ringed subscribers; analyzing additional dialed digits by the call pick-up subscriber corresponding to information in the caller information table, determining whether the additional dialed digits match a specific caller selection code, and notifying at least one of the ringed subscribers of the existence of the call pick-up subscriber;
   receiving a response message from the at least one ringed subscriber; and
   receiving a call pick-up notice message from the call pick-up subscriber, transmitting the message to a specific caller, and receiving a response message to thereby enable one-to-one communication.

9. The method of claim 8, further comprising:
   allowing telephones of the ringed subscribers to continue to ring so that another call pick-up subscriber can pick up the call, when the call pick-up subscriber sends a code for giving up the call pick-up; and
   waiting for receipt of the call pick-up feature code from the other call pick-up subscriber.

10. The method of claim 8, further comprising:
    checking whether there are other ringed subscribers in the same call pick-up group;
    transmitting a caller information request message to the other ringed subscribers; and
    receiving caller information from the other ringed subscribers and updating the caller information table.

11. A method for performing a call pick-up operation, comprising:
    receiving a call to subscribers of a same call pick-up group;
    receiving a call pick-up feature code from a call pick-up subscriber in response to said call;
    validating the call pick-up feature code;
    performing a ring subscriber search to determine states of telephones of the subscribers;
    generating and displaying a caller information table based on the states of the subscriber telephones determined by the search; and
    connecting the call to one of the subscribers based on a selection of information in the table by the call pick-up subscriber.

12. The method of claim 11, wherein the search includes:
    (a) generating a message requesting caller information,
    (b) sending the message to one of the ringed subscribers,
    (c) receiving a response message including the caller information from the ringed subscriber,
    (d) repeating steps (a)–(c) for remaining ones of the ringed subscribers, and
    (e) generating the caller information table based on the caller information obtained from the ringed subscribers.

13. The method of claim 12, wherein the caller information includes telephone numbers of the ringed subscribers.

14. The method of claim 12, wherein the caller information includes names of the ringed subscribers.

15. The method of claim 12, wherein connecting the call includes:
    receiving information from the call pick-up subscriber selecting one of the ringed subscribers identified in the caller information table;
    notifying the selected subscriber of the existence of the selection made by the call pick-up subscriber;
    receiving a response from the selected subscriber and connecting the call.

16. The method of claim 15, wherein receiving information includes:
    receiving digits from the call pick-up subscriber corresponding to a unique ID in the caller information table.

* * * * *